United States Patent [19]

Nicoll

[11] Patent Number: 4,602,429
[45] Date of Patent: Jul. 29, 1986

[54] METHOD AND APPARATUS FOR ASSEMBLING ELECTRICAL CONNECTORS

[75] Inventor: Charles Nicoll, Cheshire, Conn.

[73] Assignee: Burndy Corporation, Norwalk, Conn.

[21] Appl. No.: 568,759

[22] Filed: Jan. 6, 1984

[51] Int. Cl.⁴ .................. H01R 43/00; B23P 23/00
[52] U.S. Cl. ............................. 29/884; 29/564.6; 29/747
[58] Field of Search .............. 29/884, 882, 564.6, 29/747, 564, 564.1; 339/218 M

[56] References Cited

U.S. PATENT DOCUMENTS

| | | | |
|---|---|---|---|
| 4,188,715 | 2/1980 | Ammon et al. | 29/884 |
| 4,211,001 | 7/1980 | White et al. | 29/747 |
| 4,258,469 | 3/1981 | Salvesen | 29/884 |
| 4,410,231 | 10/1983 | Senor | 339/218 M |
| 4,417,396 | 11/1983 | Ammon et al. | 29/884 |

Primary Examiner—Mark Rosenbaum
Assistant Examiner—Carl J. Arbes
Attorney, Agent, or Firm—Clarence A. Green; Howard S. Reiter; Ernest Fanwick

[57] ABSTRACT

Method and apparatus for assembling electrical connectors of the dual in-line type wherein contacts are separated from a contact strip and inserted into contact openings in the connector body. The contacts are arranged in the contact strip at a lesser pitch then the pitch of the openings that they are received into on the body. Means and methods are described to separate the contacts from the strip and align them with their respective openings of the body to which they are assembled.

19 Claims, 25 Drawing Figures

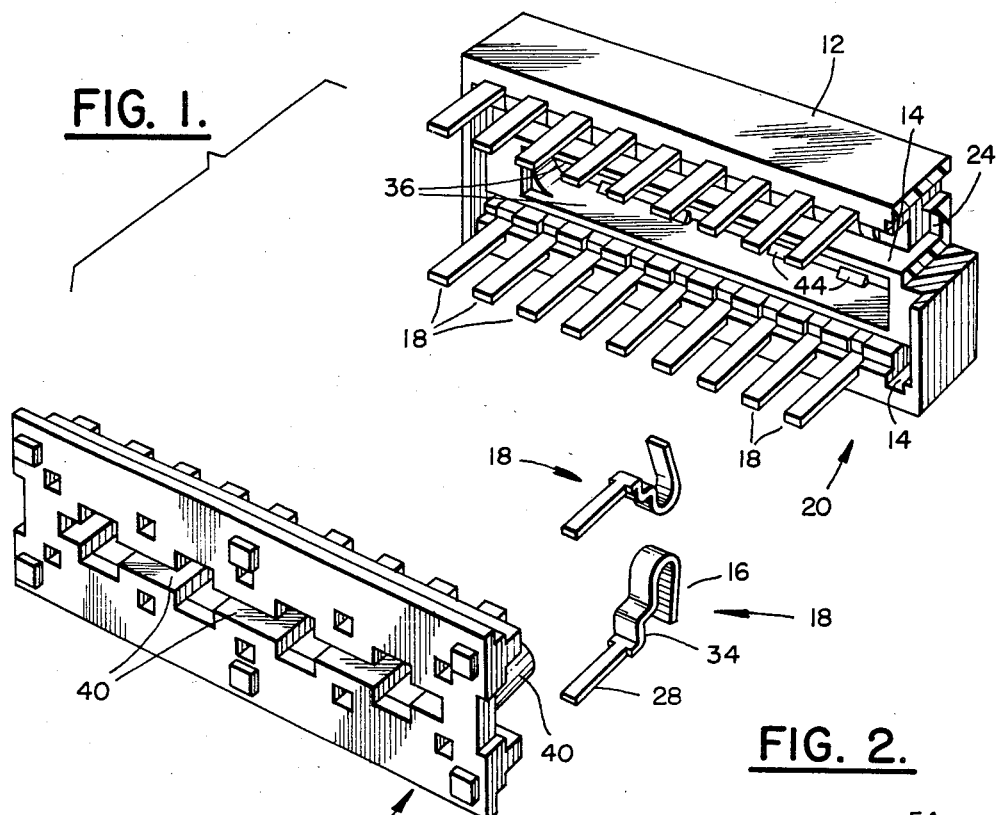
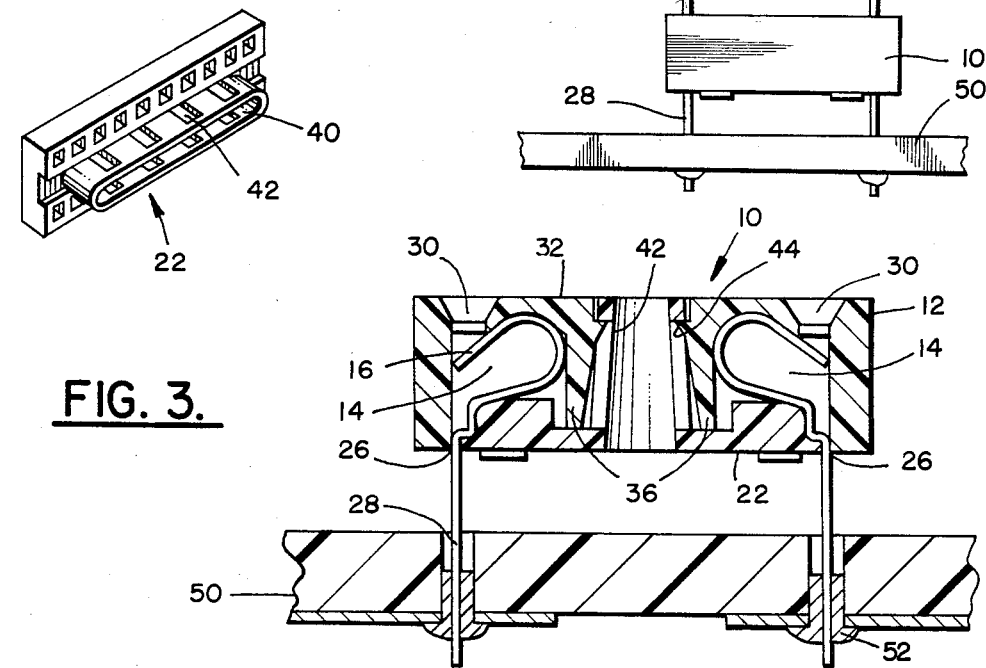

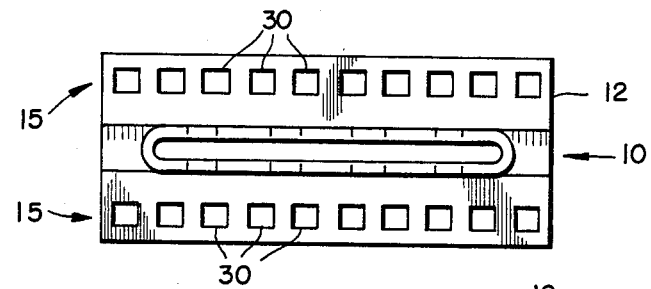
FIG. 4a.
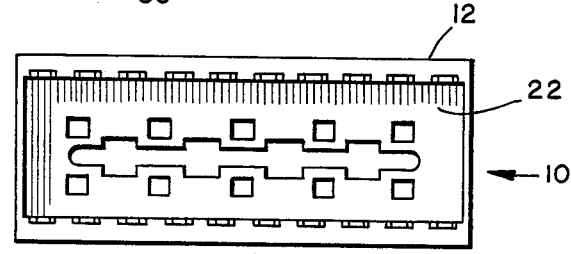
FIG. 4b.
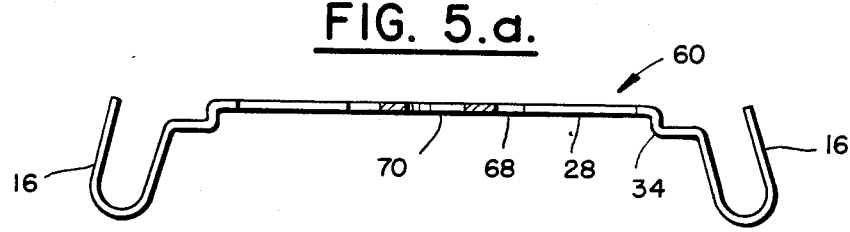
FIG. 5.a.
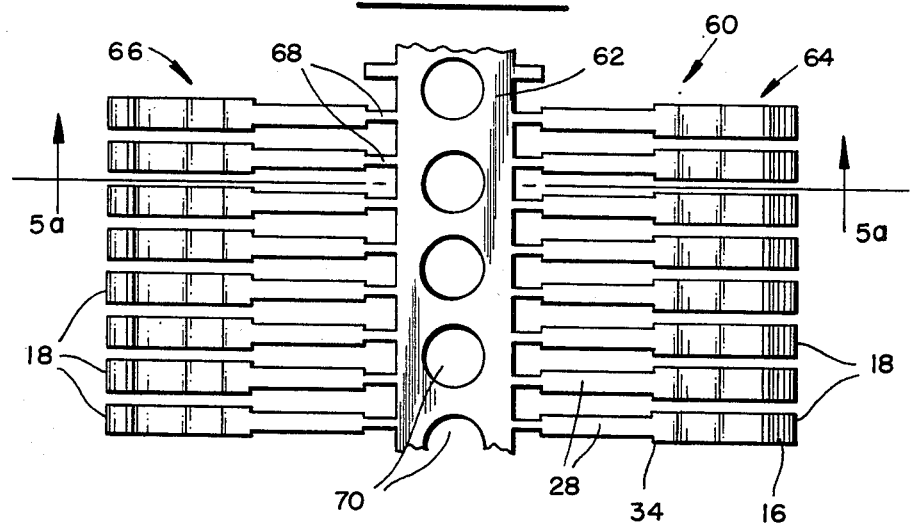
FIG. 5b.

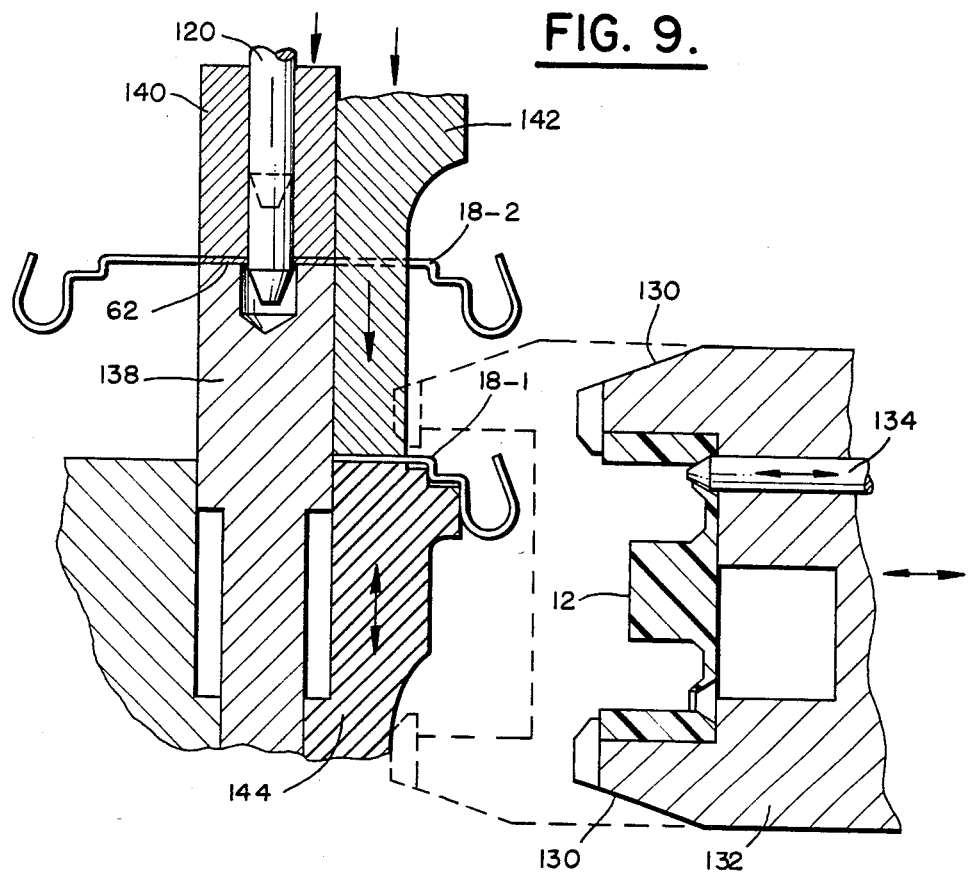
FIG. 9.
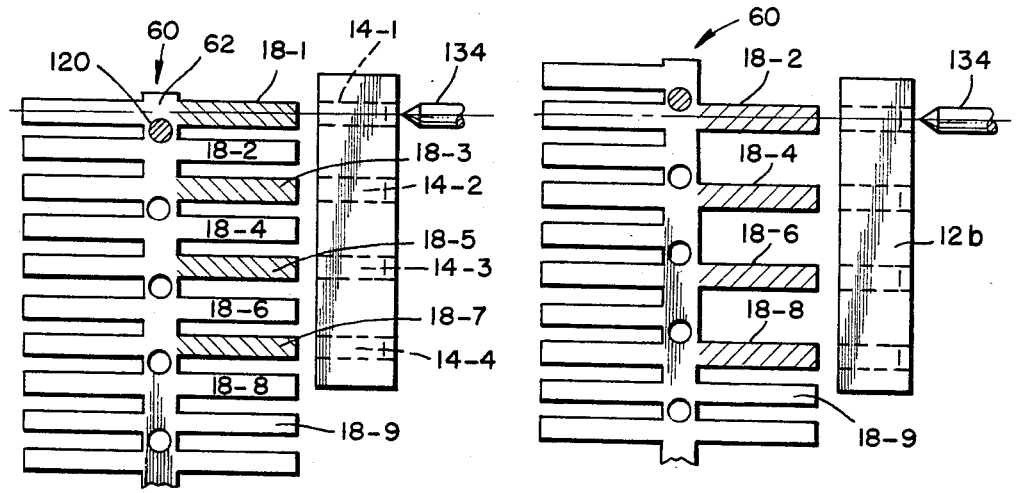
FIG. 10a.
FIG. 10b.

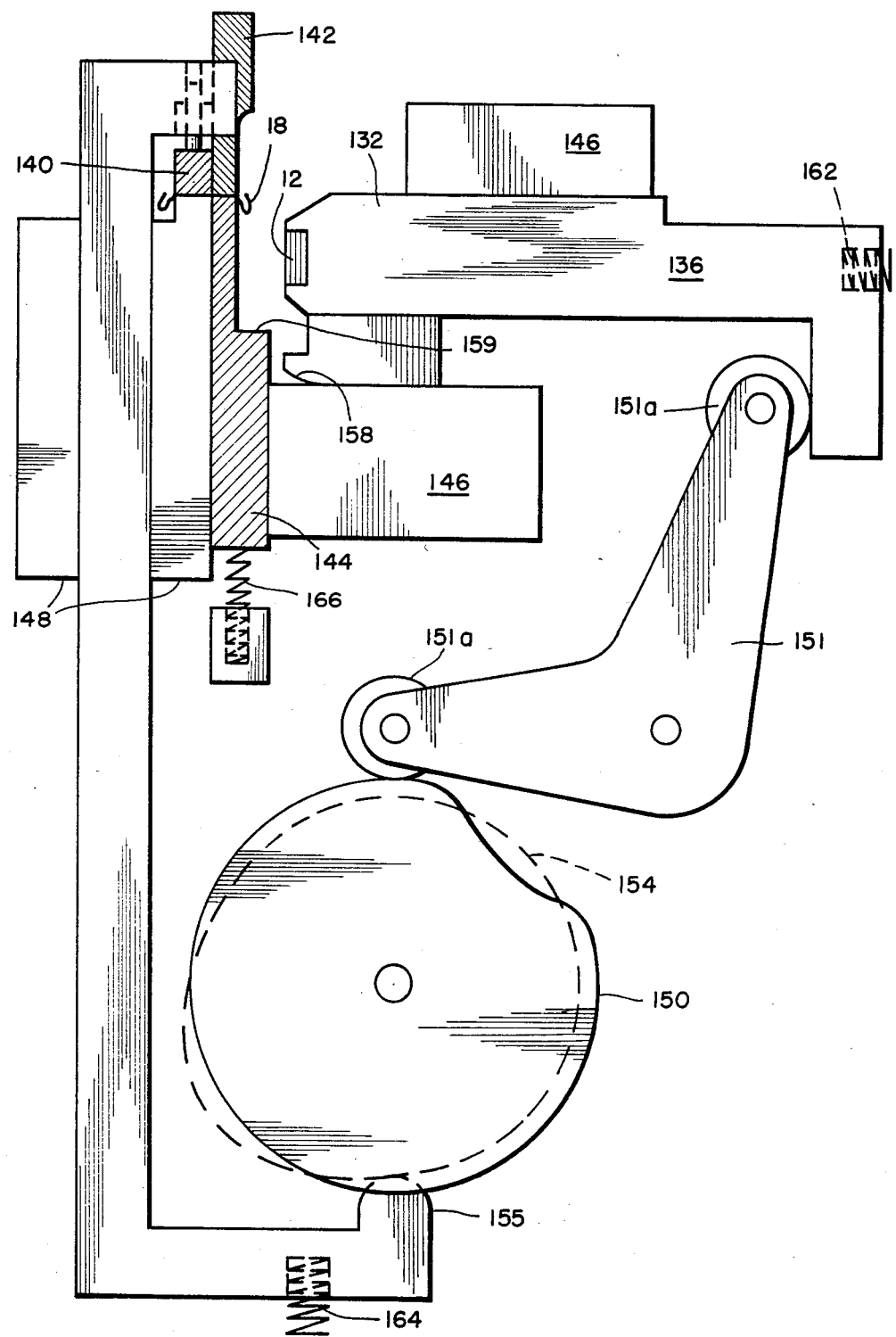

METHOD AND APPARATUS FOR ASSEMBLING ELECTRICAL CONNECTORS

BACKGROUND OF THE INVENTION

This invention relates to methods and apparatus for assembling electrical connectors of the kind having a connector body defining a plurality of openings and a conductive contact mounted in each opening.

Electrical connectors of the kind with which this invention is concerned generally comprise a body of insulating material having one or more rows of spaced openings in which the conductive contacts are mounted so that when the leads of an electrical device such as an integrated circuit are inserted into the openings through the front of the connector body electrical contact is made. Usually the contacts are arranged with one end in the associated opening in the body and the other end projecting out of the body to form a terminal leg suitable for electrical connection such as to a printed circuit board. The contact is suitably of a resilient or springy metal and has its one end shaped so as to spring-press against a said lead inserted into the associated opening through its mouth. The connector body is suitably constructed so that the contacts can be inserted into respective openings through the back thereof and the contacts are clamped in position in the openings by a base member which is attached to the back of the body after insertion of the contacts. An example of connector as above is described in a copending U.S. Patent Application, entitled "Dual In-Line Connector Assembly", invented by Rocco Noschese; Ser. No. 531,885, filed on Sept. 14, 1983, the entire disclosure of which is incorporated herein by reference.

For assembling such a connector, it is known in the prior art to serially feed connector bodies to a mounting location, advance a strip of contacts stepwise to the mounting location to register a group of the contacts on the strip with the openings in a body at the mounting location, separate the registered contacts from the strip and insert the separated contacts in respective openings in the body. The contacts are stamped from a strip of metal with one end remaining connected to the strip and are so spaced apart along the strip that when the strip is brought together with a connector body the contacts are aligned with the openings in the body. In other words, the pitch of the contacts on the strip is the same as the pitch of the openings in the connector body so that insertion can be effected simply by moving the group of contacts and the body towards each other. Thus, once the contacts, still connected to the strip, are lined up with the openings in the body, they can be broken off the strip and pushed in a straight line into the openings.

One problem, however, with spacing the contacts with the same pitch as the openings is the amount of scrap material which is created in the strip. The cost penalty can be quite substantial depending upon the material that is used for the contacts. For instance, if the contacts are made out of brass, the scrap value of the waste brass material is only about one-half of the original price of the brass. On the other hand, if the contacts are made out of a material such as beryllium, the scrap value of the waste material may be as little as one-seventh to one-tenth of its original price. This difference is further exacerbated by the fact that a material such as beryllium is seven to eight times as expensive as brass.

The present invention provides a method and apparatus for assembling electrical connectors of the kind discussed above in which the amount of waste material is reduced. It also provides a method and apparatus for automatically assembling the connectors in an automated fashion at relatively high rates of speed.

SUMMARY OF THE INVENTION

In accordance with the invention, there is provided an improved method of assembling such electrical connectors wherein the pitch of the contacts on the strip is less than the pitch of the openings in the connector body whereby the contacts of each group of contacts are interspersed with the contacts of at least one other group of contacts. For example, the pitch of the contacts may be one-half the pitch of the body openings. In this case, when one group of contacts is registered with the body openings, adjacent contacts of the group will be separated by the contacts of one other group; i.e., the group will be formed by alternate contacts. The first interspersed group of contacts is registered with the openings of a first body, separated from the strip and inserted into the body. Then, the other interspersed group of contacts is registered with the openings of a second connector body, separated from the strip and inserted into the openings of that body. Suitably, the pitch of the contacts in this embodiment is a whole number sub-multiple; i.e., one-half, one-third, one-quarter, etc., of the pitch of the openings. The actual number depends on the spacing of the openings relative to the width of the contacts. The larger the gap between the openings for a given contact width, the larger may be the number of interspersed groups. In order to index the contact strip correctly, it is advanced by different amounts depending on whether the next group of contacts to be registered is interspersed with the last group of contacts which were registered, separated and inserted. This is more fully explained below.

By reducing the pitch of the contacts on the strip, wastage of the strip material is reduced, and, as will be apparent from the discussion of material values above, the cost savings can be substantial. It will further be realized that by suitable choice of the dimensions and spacing of the openings and contacts when designing the connector, the wastage of strip material can be reduced to a minimum.

From another aspect of the invention, there is provided apparatus for assembling electrical connectors, as described above, which includes means for feeding connector bodies and a strip of contacts to a mounting station to register successive connector bodies with respect to successive groups of contacts on the strip. The contacts in each group correspond in number and pitch to the openings in the connector bodies, but the contacts on the strip have a pitch which is less than the pitch of the body openings. By virtue of this arrangement, the contacts of each group are interspersed with the contacts of at least one other group. Means is provided for separating from the strip the contacts in a group registered with respect to a connector body at the mounting station. Means is also provided for inserting the separated contacts into respective openings in the connector body at the mounting station. The feeding means is adapted to effect different relative feed movements of the strip and the connector bodies depending on whether the next group of contacts to be registered with respect to the next connector body was interspersed with the group of contacts just inserted in the immediately preceding connector body. Thus, if the next group of contacts to be inserted were interspersed with the immediately previously inserted group of contacts, the feed movement is small and equal to the pitch of the contacts. On the other hand, if the next group to be inserted was not interspersed, a larger feed movement is required to bring the next group of contacts on a fresh section of strip into alignment with the next connector body.

In one embodiment, the feeding means includes a first means for serially feeding connector bodies to the mounting station and a second means for advancing the contact strip stepwise. The body feed means positions the connector bodies at the mounting station with their openings out of tracking or lateral alignment with the strip of contacts, but with the openings longitudinally aligned with the contacts; i.e. in the direction of strip advance. After the contacts have been separated, they are displaced to line them up with the openings in the connector body. At this point, the inserting means displaces the connector body towards the contacts so that they enter the openings in the connector body. By displacing the separated contacts relative to the strip before insertion, the connector body can be moved towards the contacts to receive them without fouling the 'interspersed' contacts remaining on the strip.

In a preferred apparatus of the invention, the contact strip is advanced to effect the feed movement, successive bodies all being located in the same position at the mounting station.

A preferred form of connector of the kind with which this invention is concerned has two rows of openings for contacts. In accordance with a feature of the invention, the contacts of a first group of contacts on the strip are inserted in the openings of one row and the contacts of a second group of contacts on the strip are inserted in the openings of the other row. Suitably the contact strip has a first series of contacts projecting in one direction and a second series of contacts projecting in the opposite direction. In this case, each connector body is first aligned with respect to a group of contacts of the first series to receive those contacts in the openings of the one row at a first said mounting location. In one embodiment, the body then inverted and aligned with respect to a group of contacts of the second series to receive those contacts in the other row at a second said mounting location. In another embodiment, the strip of contacts is inverted after the body receives the first series of contacts so that the body can then be aligned to receive the second series of contacts at the second mounting location.

Where the contacts are clamped in position in the connector body by a base member which is attached to the body, a feature of the invention is assembling a base member to each body after the contacts have been inserted in the openings.

The connector bodies may be fed to the mounting location (station) one at a time or in batches. In the latter case a number of side-by-side groups of contacts equal to the number of connector bodies in a batch is registered with respect to the bodies. The contacts of all the registered groups are simultaneously separated from the strip and, then, simultaneously inserted in the respective openings of the connector bodies in the batch.

BRIEF DESCRIPTION OF THE DRAWINGS

In order that these and other aspects of the invention may be more readily understood, reference will now be made to the accompanying drawings, in which:

FIG. 1 is an exploded perspective view, partly cut away, of a connector of the kind with which the apparatus and method of this invention are concerned, FIG. 1a shows another view of a base member of the connector shown in FIG. 1, FIG. 2 is an end view of the connector shown in use on a circuit board with an integrated circuit device plugged into it, FIG. 3 is a cross-section through the connector shown mounted on a circuit board, FIG. 4a is a top plan view of the connector, FIG. 4b is a bottom plan view of the connector, FIG. 5a is a cross-section through a strip of contacts for use in assembling a connector in accordance with the invention taken along the line 5a–5a of FIG. 5b, FIG. 5b is a partial plan view of the strip of contacts, FIG. 9 shows mechanisms for separating contacts from the strip and for inserting the separated contacts into openings in a connector body, FIGS. 10a to 10c illustrate schematically three stages in the alignment and separation from the contact strip of two interposed groups of contacts, FIGS. 11a to 11e show apparatus for performing the contact aligning, separating and inserting steps with the elements thereof shown in the different figures as they are positioned at five different stages in the sequence of operations.

DETAILED DESCRIPTION

Figure 6A:
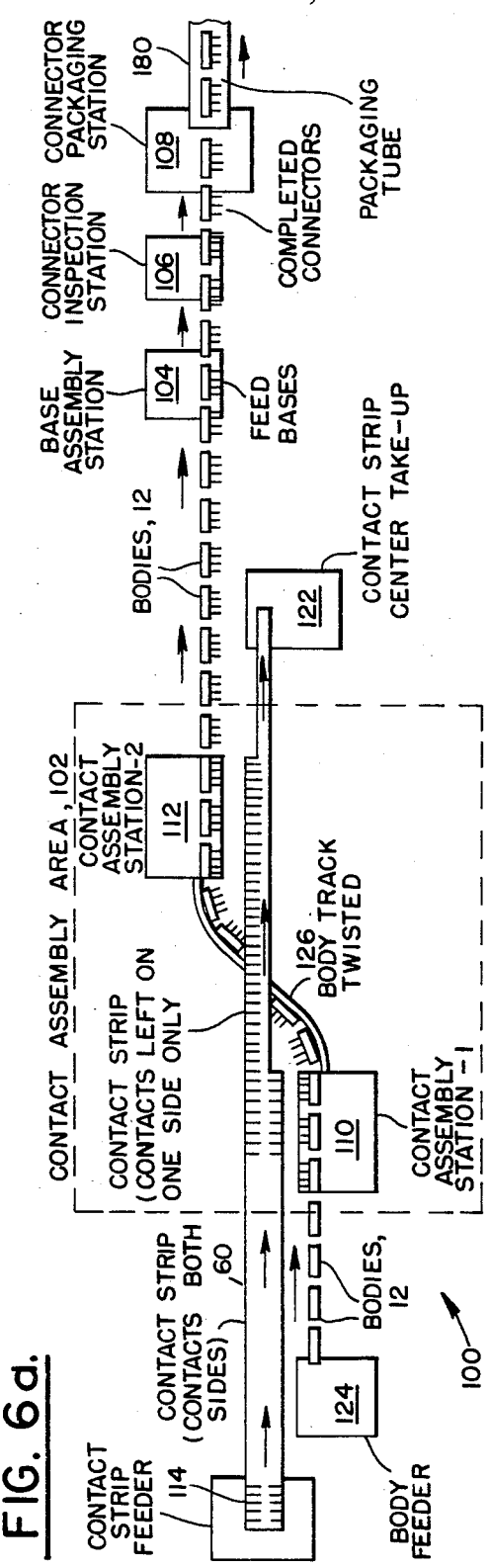
FIG. 6a is a schematic plan view of one embodiment of connector assembly line according to the invention.

Referring now to the drawings, a typical embodiment of connector 10 of the kind with which the assembly methods and apparatus of this invention are concerned is shown in FIGS. 1 to 4. Such a connector is constructed in accordance with aforesaid copending patent application which has been incorporated herein by reference. The connector generally comprises a body 12 of any suitable material, such as a plastic insulating material, defining a plurality of openings or sockets 14. Each opening contains one end 16 of a conductive contact 18. The back 20 of the connector body 12 is open and, during assembly, the contacts 18 are inserted into the openings 14 through the open back. A base member 22 attached to the back of the body 12 clamps the contacts 18 in position in the openings 14 and closes the back of the body. Suitably, the base 22 can be a snap fit on the body 12.

The openings 14 define recesses 24 in the body which are shaped to receive the ends 16 of the contacts 18 which, as explained below, are hook-shaped. The shaped contact ends 16 are clamped in place by the base 22. The base 22 serves to close off the openings 14 behind the shaped ends leaving a gap 26 along each side through which the other ends of the contacts project to form straight terminal legs 28. The mouths of the openings 14 are formed by apertures 30 in the front face 32 of the connector body 12. The apertures are dimensioned to receive the leads (terminal pins) of an electrical device to be mounted on the connector. To assist in guiding these leads into the openings 14, the apertures 30 are countersunk. In the exploded view of FIG. 1, the body 12 is broken away to show a section through one of the openings 14 with the associated contact 18 removed. For added clarity, another opening 14 is shown with its contact removed.

The contacts 18 are made of any suitable material such as a resilient or springy, conductive metal; for instance, brass or beryllium. Contact ends 16 are shaped to spring-press against leads inserted into the openings 14 through the apertures 30. It is for this reason that each contact end 16 is bent over into a hook-like shape. The hook-like ends are pressed into the recesses 24 by the base 22 which is shaped to engage snugly with a step 34 in each contact 18 intermediate the hook 16 and the straight leg 28.

In the embodiment shown, the connector 10 has two rows 15 of ten openings 14. The connector shown is symmetrical about its longitudinal axis so that opposed contacts 18 are arranged back-to-back as seen in FIG. 3. This scheme provides maximum spacing for the width of the body of the apertures 30 and the contact legs 28. The inner sides of the openings 14 are formed by ribs 36 on the inside of the body 12. These are interconnected at their ends only leaving a longitudinal opening 38 through the center of the body. The base member 22 has a series of spaced tongues 40 which enter the opening 38 when the base member is pressed against the body. The tongues 40 have lips 42 at their outer ends which engage behind barbs 44 on the body 12 in the opening 38 to hold the parts together.

In use, the connector 10 may be mounted, for example, on a printed circuit board 50 as shown in FIG. 3, with the legs 28 soldered in position as at 52. It may be used for connecting in circuit an electrical device, such as an integrated circuit device (IC) 54 as shown in FIG. 2. The connector has a number of openings 14 equal to the number of leads 56 on the IC 54.

A preferred method and apparatus in accordance with the invention for assembling an electrical connector 10 as described above will now be described with reference to FIGS. 5 to 13.

The contacts 18 are supplied in a strip 60 which, as shown in FIGS. 5a and 5b, comprises a central ribbon 62 from one edge of which a first series 64 of contacts 18 project in one direction and from the other edge of which a second series 66 of contacts of 18 project in the opposite direction. The contacts of both series 64, 66 extend outwardly from the ribbon 62 in the plane of the ribbon and at right angles to the edge of the ribbon. The leg ends 28 of the contacts are attached to the ribbon by narrow webs 68 and the hooked ends 16 of the contacts are the outer, free ends. The ribbon 62 is punched at closely-spaced regular intervals throughout its length with a row of holes 70.

In a preferred embodiment intended for assembly with connector bodies having openings spaced at intervals of one-tenth of an inch, the contacts on the strip 60 are spaced at one-twentieth of an inch intervals.

Turning now to FIGS. 6a–d, these schematically illustrate a complete assembly line 100 for assembling and packaging connectors 10 as shown in FIG. 1, and give an overview of the entire process. Referring to FIGS. 6a and b in particular, a continuous stream of connector bodies 12, as shown in FIG. 1, and a contact strip 60, as shown in FIG. 5, are transported from left to right along the assembly line. They are brought together at a contact mounting or assembly area 102 where successive groups of contacts 18 are registered with respect to successive connector bodies 12, separated from the strip and inserted into the bodies.

After a body 12 has received its contacts, it is fed to a base assembly station 104 where a base member 22 is attached to it to clamp the contacts in position and form the completed connector. The completed product is then passed through an inspection station 106 to a packaging station 108.

The connector bodies 12 have two rows 15 of openings 14. At the contact assembly area 102, contacts 18 from one side of the contact strip 60 are mounted in the openings 14 of one row 15 at a first contact mounting or assembly station 110 and, then, contacts from the other side of the contact strip are mounted in the openings 14 of the other row 15 at a second contact mounting or assembly station 112. As seen clearly from FIG. 1, the contacts 18 are inserted into the openings 14 through the back of each body. Thus, in the embodiment shown in FIGS. 6a and b, the bodies are fed to the first contact assembly station 110 arranged with their backs 20 facing the first series 64 of contacts on the strip 60. Then, they are inverted as they are conveyed between the assembly stations 110, 112 so that their backs are arranged facing the second series of contacts 66 on the other side of the contact strip at the second contact assembly station 112. Alternatively, as shown in the embodiment of FIGS. 6c and d, the bodies travel between stations 110 and 112 without inversion while the strip is twisted or inverted between these stations.

Figure 6B:
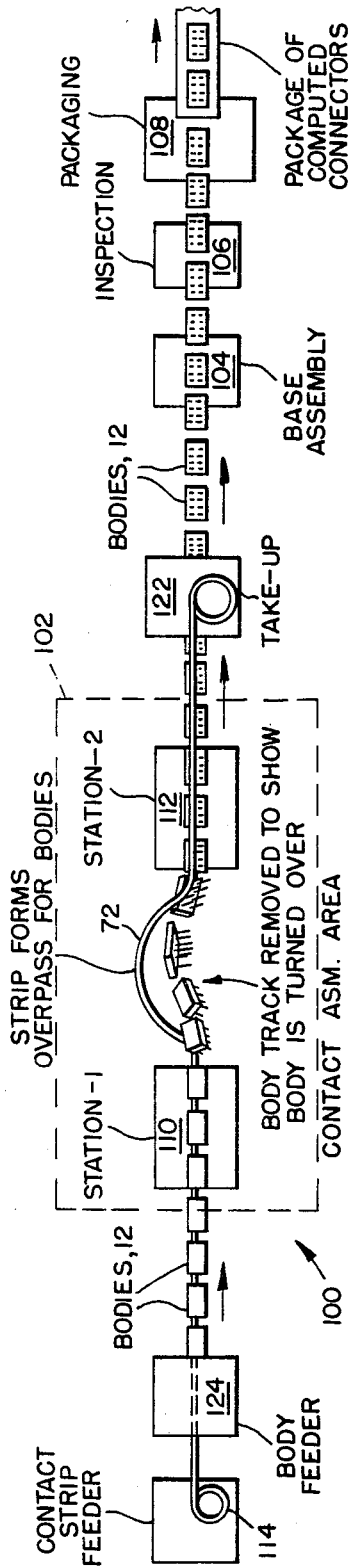
FIG. 6b is a schematic side view of the assembly line of FIG. 6a, FIG. 6c is a schematic plan view of a second embodiment of a connector assembly line according to the invention.
Figure 6C:
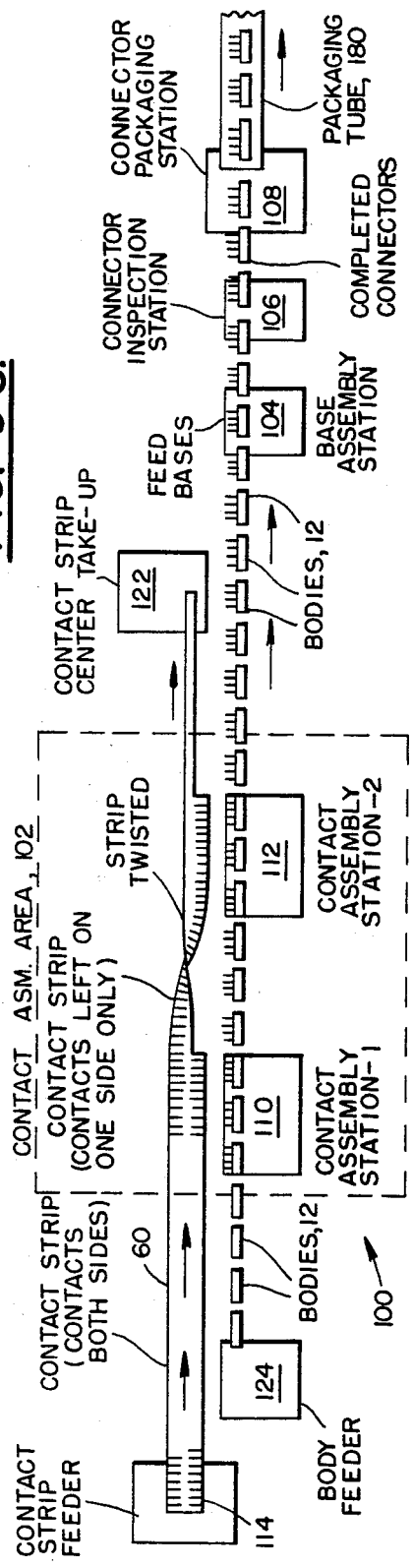
FIG. 6d is a schematic sideview of the assembly line of FIG. 6c.

As shown in FIGS. 6a and 6b, the contact strip 60 is advanced in a horizontal plane and the bodies 12 are fed on one side edge through the assembly station 110 and on the other side edge through the assembly station 112. In this manner, the uppermost row 15 of body openings 14 is arranged to receive the contacts at each contact assembly station 110, 112.

At each contact assembly station 110, 112, a group of contacts 18 on the strip 60 is aligned with a row 15 of openings 14 in the body positioned at the assembly station. The number and pitch of the contacts in the group are equal to the number and pitch of the openings 14 in the row 15 so that a contact 18 is arranged opposite each opening 14. The contacts are then separated from the strip 60 and inserted in the respective openings in the body. It should be noted that although the contacts 18 and openings 14 are aligned in the direction of advance of the strip; i.e., longitudinally, the strip may be out of tracking (lateral) alignment with the openings for the reason explaind below. In this case, the separated contacts 18 can be moved into complete alignment with the openings prior to insertion.

In accordance with this invention, the pitch of the contacts 18 on the strip 60 is less than the pitch of the openings 14 in the bodies 12 so that the contacts of each group of contacts are interspersed with the contacts of at least one other group. The pitch of the contacts 18 is, preferably, a whole number sub-multiple (one-half, one-third, etc.) of the pitch of the openings 14. In the embodiment illustrated, the pitch of the contacts on the strip is one-half the pitch of the openings in the bodies. Thus, in this embodiment, when a fresh section of the strip 60 is presented to a body 12, alternate contacts 18 are aligned with the openings in the body.

In operation, when a fresh section of strip is presented at the contact assembly station 110 or 112, the leading contact is aligned with the leading body opening with alternate contacts aligned with the remaining openings. After separation and insertion into the body openings of these contacts, the next body portion is positioned at the assembly station and the contact strip 60 is advanced by one contact pitch to bring into register with this body 12 the contacts 18 which were interspersed with the contacts just removed and inserted into the previous body 12. After insertion of these contacts from the second of the interspersed groups, another body is brought into position and the strip is then advanced to bring a new section of the strip into register with this body. For this, the strip 60 is advanced through n−1 pitches where n is the number of contacts in the two interspersed groups; i.e., twice the number of contacts in any one group. It will thus be realized that the strip 60 is alternately advanced by a first larger distance 'A' to present a new section of strip at the assembly station with a first of two interspersed groups of contacts 18 aligned with a body 12 and by a second smaller distance 'B' to align the second of the interspersed groups of contacts with the next body.

Figure 10C:
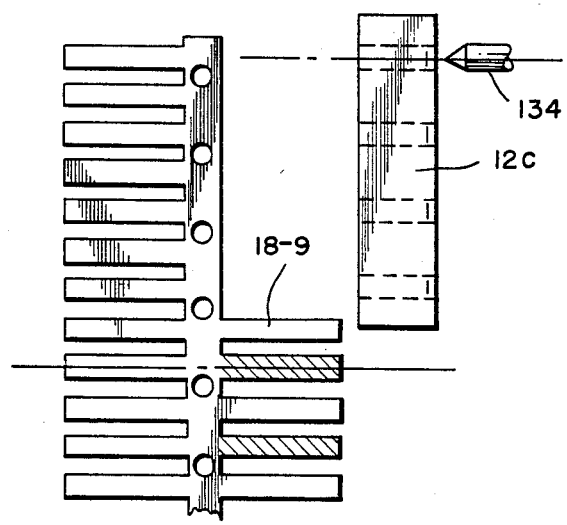

The manner of advancing the contact strip 60 as just described will be more readily appreciated by reference to FIGS. 10a–10c in which FIG. 10a shows a fresh section of strip aligned with a body 12a. The leading contact 18-1 and the leading body opening 14-1 have their center lines lined up with a reference line 80 so that contacts 18-3, 18-5 and 18-7 are lined up with the respective openings 14-2, 14-3, 14-4. Following separation, the contacts are inserted into the openings. Body 12a is then replaced by a fresh body 12b which, as shown in FIG. 10b, is lined up with its leading opening 14-1 on the reference line 80. The strip 60 is advanced by one contact pitch to bring the contact 18-2 to the reference line 80 and aligned with the opening 14-1 of the body 12b, contacts 18-4, 18-6 and 18-8 being aligned with the other body openings. These contacts are separated and inserted into the body 12b and a fresh body 12c brought into position producing the situation shown in FIG. 10c.

In order to bring the next group of contacts 18 into line with the body 12c, a fresh section of strip 60 is advanced for presentation at the assembly station. As can be seen, this is achieved by advancing the strip 60 by seven; i.e. 8 minus 1, contact pitches until the contact 18-9 is aligned with the reference line 80. Thus, there are two operations to remove any section of contacts from the strip.

It may be noted by way of interest at this point that where the pitch of the contacts 18 on the strip is one-third the pitch of the body openings 14, distance A will be equal to n−2 contact pitches and there will be two 'B' movements for each section, each equal to one contact pitch.

Although the alignment process is described above as aligning the center-line of the leading contact 18 to the center-line of the leading body opening 14, it can be done in any suitable fashion that is desired as long as the contacts are in a position to be inserted into the openings of the connector body 12.

As mentioned above, in the embodiment shown in FIGS. 6a and 6b, the bodies 12 receive contacts 18 from one side of the contact strip 60 in one row 15 at the first contact assembly station 110 and are then inverted and transferred to the other side of the contact strip to receive contacts from that side of the strip in the other row at the second contact assembly station 112. Alignment, separation and insertion of the contacts is carried out at the second assembly station 112 in the same way as described above with respect to the first contact assembly station 110. In order to minimize wastage, each body 12 desirably receives at the second contact assembly station 112 contacts which were directly opposite the contact mounted in the same body at the first contact assembly station 110. Coordination of the body and contact strip between the stations 110, 112 is not required if an accumulator is used. The accumulator is used to temporarily store the contact strip as necessary so that feeding at station 112 can be independent of the feeding at station 110. An accumulator located in the vicinity of reference number 72 of FIG. 6b can be of any suitable type such as a dancer roll. The portions of the strip on either side of the dancer roll can be driven by a stepper motor, such as within stations 110 and 112, to maintain coordination with the bodies.

Figure 6D:
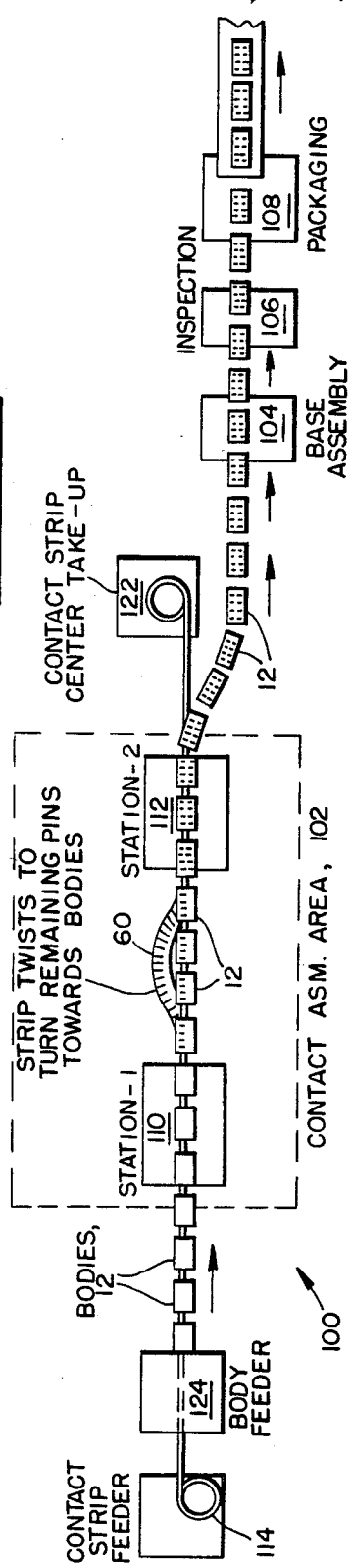
Figure 7:
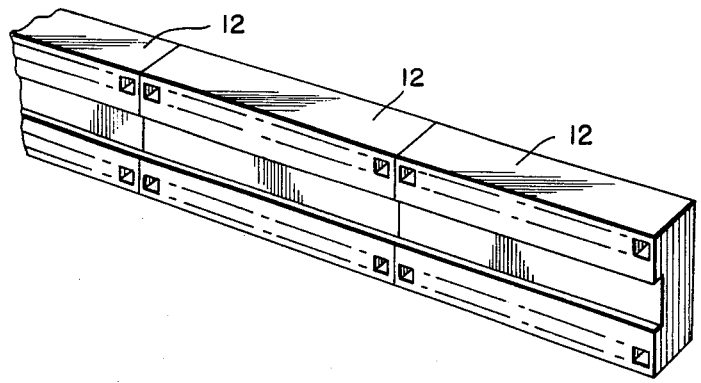
FIG. 7 shows a series of connector bodies as they are arranged during feeding along the assembly line.

Although the bodies 12 are shown spaced in FIGS. 6a and b for maximum throughput, the bodies are desirably fed in end-to-end abutting relation as shown in FIG. 7. Referring further to FIG. 7, it will be noted that the end openings in each body are spaced from the respective end thereof by half the spacing between adjacent openings. This improves and simplifies the assembly process since all movements may be whole number multiples of body opening/contact pitch. It further enables the bodies to be fed to the contact assembly stations 110, 112 in batches for further increasing throughput. Thus, as shown in FIG. 6, they may be advanced in batches of three in which case for bodies having rows of four openings, twelve contacts on the strip 60 are aligned, separated and inserted at each assembly station 110, 112 at the same time. In this instance, each distance A corresponds to 23 (24 minus 1) contact pitches, or stated more generally, m−1 pitches where m is equal to twice the number of openings in the batch of bodies 12. The smaller distance B is always equal to one contact pitch regardless of the number of bodies in the batch.

In another example for assembling connectors as shown in FIG. 1, bodies 12, each having two rows 15 of ten openings 14, are presented at the contact assembly stations in batches of three. In this case, thirty alternate contacts 18 on the adjacent side of the contact strip 60 are removed and inserted in the manner described above into the first batch of bodies leaving thirty contacts remaining on the same section of strip. The first batch of bodies 12 are dispatched along the assembly line 100 and a second batch aligned with the remaining thirty contacts which are removed and inserted into these bodies.

Figure 8:
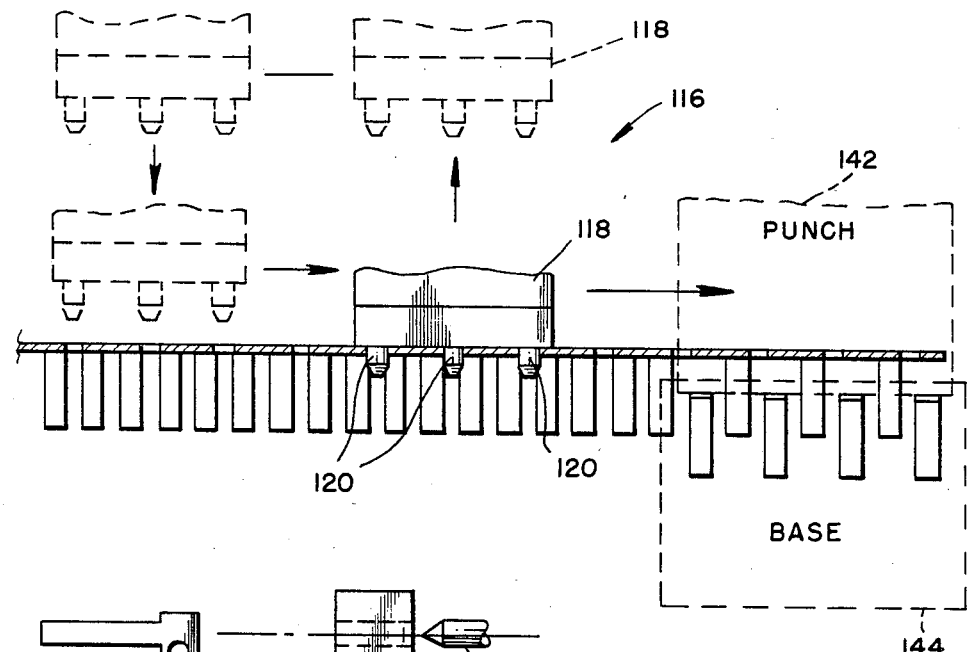
FIG. 8 shows schematically one possible mechanism for advancing the contact strip along the assembly line.

The apparatus shown in FIGS. 6a and 6b will now be described in greater detail. The contact strip 60 may be fed from any suitable source. For instance, it may be fed off a supply reel 14 arranged at the head of the assembly line 100. The advancing mechanism for feeding the strip 60 may be of any suitable type. In this embodiment it is a reciprocating pin-type drive mechanism 116, as shown in FIG. 8, which cooperates with the holes 70 in the central ribbon 62 of the strip. The drive mechanism 116 may be arranged at any suitable location along the run of the contact strip. In FIG. 8, it is shown just upstream of the first contact assembly station 110. The mechanism 116 comprises a drive member 118 having three pins 120 which are spaced to engage in the holes 70 in the contact strip ribbon 62.

To advance the contact strip 60, the drive member 118 is raised from its full line position of FIG. 8 and returned to an upstream position, as illustrated in broken lines, and, then, advanced to feed the strip forwards. The forward stroke is divided into two parts corresponding respectively to distances A and B. In the example illustrated in FIG. 8 where the contact pitch is half that of the body openings and there are four body openings, the distance A equals seven contact pitches and the distance B equals one contact pitch giving a composite forward stroke for the member 118 of eight contact pitches. Thus, in this or any other suitable manner, the contact strip can be moved a predetermined distance to align contacts with the bodies in the contact assembly area 102. Following removal of the contacts from the strip at the contact assembly stations 110 and 112, the remaining ribbon is advanced to a take-up spool 122 for collection.

The bodies 18 of the connectors can be fed from a body feeder 124 in any suitable fashion into the contact assembly area. For instance, the feeder can be a moving belt system (not shown) having a supply of bodies in operating contact therewith. The bodies 12 are fed towards the contact assembly stations on their edges as shown in FIG. 7. As mentioned above, the contacts used in this embodiment are actually assembled into a connector body through the back 20 of the body. Thus, the backs of the bodies must face the contact strip 60 as it is being fed into the contact assembly area. The body feed belt system advances the bodies in serial manner, end-to-end, with a substantial pressure forcing them together and into the contact assembly area so that there is no space between the individual bodies.

Referring to FIGS. 6a and 6b, the contact assembly area 102 is outlined in dotted lines. It basically consists of the contact assembly station 110, the contact assembly station 112 and a body track 126 between these stations which twists so as to turn the connector bodies over between the two stations. In FIG. 6b, the body track 126 is omitted so that the action of the body track on the bodies 12 passing between the two stations 110 and 112 can be illustrated. The track 126 is twisted so that as the bodies emerge from station 110 with contacts extending along one side thereof, they pass to the other side of the contact strip. The contact strip 60 itself forms a buckle 72 between the two stations so that an overpass is created for the bodies to pass under. As the bodies pass under the strip, they are inverted so that their back sides 20, through which the contacts 18 placed in the bodies in station 110 project, are facing the contact strip. However, the bodies are so arranged in station 112 that the empty row of openings 14 is positioned to receive the contacts 18 from that side of the strip.

It is to be noted that as the bodies are fed across the body track 126 between the two stations 110 and 112, there is substantial pressure on the bodies keeping them close together. This is possible without creating a substantial gap between the adjacent bodies at each of the stations because the machine works very rapidly. For instance, in one embodiment of the apparatus of this invention, three bodies have their contacts placed therein simultaneously in both station 110 and 112. However, since the process occurs at the rate of about three hundred bodies per minute (five per second), there is no time for gap creation between the various bodies in the track.

It will also be seen from FIG. 6a that the nature of the contact strip changes as it passes from station 110 to station 112 and then to any suitable collection such as the contact strip ribbon take-up spool 122. The contact strip ribbon could alternatively be cut into small lengths and dropped into any suitable container at 122. At station 110, the contacts on one side are removed from the ribbon. Thus, as the contact strip 60 leaves station 110 and moves towards station 112, only the contacts on the upper side remain on the strip. As the strip moves from station 112 towards the contact strip ribbon take-up, all contacts have been removed and all that remains is the ribbon 62. The ribbon take-up 122 can be any suitable mechanism such as the spool or reel mentioned above.

An alternative embodiment of the contact assembly area 102, and the assembly process as a whole, is shown in FIGS. 6c and d. In this embodiment the strip 60 is twisted rather than body track 126. Thus, the connector bodies continue to be fed on one side of the strip between stations 110 and 112. As can be seen in FIG. 6d, the position of the strip after being twisted in such that it is aligned with the lower row of contact holes in the body assuming that the contacts were placed in the upper row of contact holes in station 110.

Each series 64 and 66 of contacts 18 is assembled to the bodies on the same side of the strip feed. The upper holes in the bodies first receive contacts at station 110 and the lower holes in the bodies receive contacts at station 112, the strip 60 being twisted approximately 180 degrees between the stations to present the first and then second series of contacts to the bodies.

The manner in which the contacts 18 are separated and inserted in this embodiment will now be described with reference to FIG. 9 which shows the operating elements of the first contact assembly station 110. It is understood that the second contact assembly station 112 is the same, functionally and in terms of hardware, as the first station, but is a mirror image thereof.

One or more bodies can be worked on at one time in the assembly stations 110 and 112. However, for the sake of clarity, the following description assumes that only one body is being worked on at a time.

At each contact assembly station, the body 12 is clamped in the jaws 130 of a body holder 132. The lower jaw 130 is fixed and the upper one is a moveable spring-loaded jaw which can be retracted to open the holder 132 for body removal and input. Fine longitudinal alignment of the body with the reference line 80 is effected by a shot pin 134. This pin is inserted in one of the apertures 30 in the body and has a tapered end corresponding to the countersink of the aperture so that if the body is received in the holder 132 slightly out of alignment this can be corrected. The holder 132 is mounted on a carriage 136 for reciprocating movement towards and away from the strip for the purpose described below.

The ribbon 62 of the contact strip 60 is located at the assembly station between a fixed lower strip holder 138 and an upper strip holder 140 which, in a modification of the strip advancing mechanism 116, incorporates retractable pilot pins 142 and is reciprocable for indexing the strip. Although the contact strip 60 is aligned longitudinally with the body 12 in the jaws so that the contacts 18 to be separated and inserted are opposite the respective openings in the body, the strip is disposed above the body holder 132 and is out of tracking alignment with the body. The reason for this will become apparent from the following.

The contacts 18 are separated from the strip 60 by a set of cutting punches 142 and pressure pads 144, there being a number of punches and pads equal to the number of contacts to be separated at one time. When the selected contacts are to be removed from the strip and inserted into the body, the cutting punches 142 and pressure pads 144 are brought together firmly to grip the contacts. Then, they are displaced downwardly, as shown in FIG. 9, to cut the contacts 18 from the webs 68 joining them to the ribbon 62 and bring the broken off contacts into full alignment with the openings 14 in the body. It will be seen from FIG. 9 that since only alternate contacts have been separated from the strip, there are still contacts projecting from the same side of the strip.

When the contacts have been cut off the strip and lowered, the holder 132 is moved to the left towards the contacts to drive the openings in the body held therein onto the contacts that have been cut off. It will be noted that, during insertion, the contacts are firmly supported by the pressure pad 144. This is because the pad is shaped to conform to the configuration of the contact and has surfaces which engage behind the step 34 and the hook 16 of the contact. Once the contacts have been captured by the body, the cutting punches 142 move upward thereby releasing their grip on the contacts. The holder then moves to the right bringing the body, with the contacts inserted therein, back in line with the feed stream of bodies so that the body can be fed out of the jaws. It will now be realized that the contact strip 60 must be arranged out of tracking alignment with a body in the holder to allow the latter to be moved inwards for inserting the contacts in the body without interfering with any intermediate contacts remaining on the strip.

While the cutting punches 142 and pressure pads 144 are located apart from each other, the contact strip 60 is re-indexed to place the next group of contacts 18 to be cut therefrom in position to be grasped by the cutting punches and pressure pads. Meanwhile, the jaws 130 have been opened allowing the body which just had contacts 18 inserted therein to move downstream while a new body is placed into the carriage and grasped by the jaws for the next insertion operation.

The structure of the apparatus that carries out the above-described separation and insertion functions is shown in FIGS. 11a–11e. It has fixed frame members 146 which form guide surfaces for the moving elements of the apparatus. One of these forms the lower strip holder 138. The carriage 136 slides back and forth in a horizontal plane under the control of a cam 150, shown in solid lines, and cam follower 151 which comprises a crank arm having rollers 151a at each end which respectively engage the cam 150 and the carriage 136. The cutting punch 142 and pressure pad 144 are moved in the downward direction according to the action of a cam follower 155 which rides on a cam 154 shown in dotted lines.

The upward motion of the cutting punch 142 is also controlled according to the movement of cam follower 155 and cam 154. However, the upward movement of the pressure pad 144 is controlled by a cam 158 which is located on a member 148 attached to the carriage 136. Cam 158 operates in combination with cam follower 159 which is located on the pressure pad 144. As the carriage 136 slides to the right after a group of contacts have been inserted in the body, the cam 158 delays the upward movement of the pressure pad to allow time for the previously assembled contacts with body to be withdrawn. When carriage 136 is withdrawn prior to strip feed, pad 144 moves upward to its original position. The carriage 136 is biased towards the left in the drawings by a spring 162. Cam follower 155 and the pressure pad 144 have springs 164 and 166 which bias them upwards. The cutting punch 142 is rigidly fastened to cam follower 155. The cams 150 and 154 rotate clockwise.

FIG. 11a shows the mechanism at a time when the cutting punch and pressure pad have come together to grasp the contact strip after the contact strip has been indexed forward. The carriage 136 is in its right-hand position by virtue of the position of cam 150 and a new body 12 is being fed into the body holder jaws 130. Both the cutting punch 142 and the pressure pad 144 are in their uppermost positions.

Figure 11B:
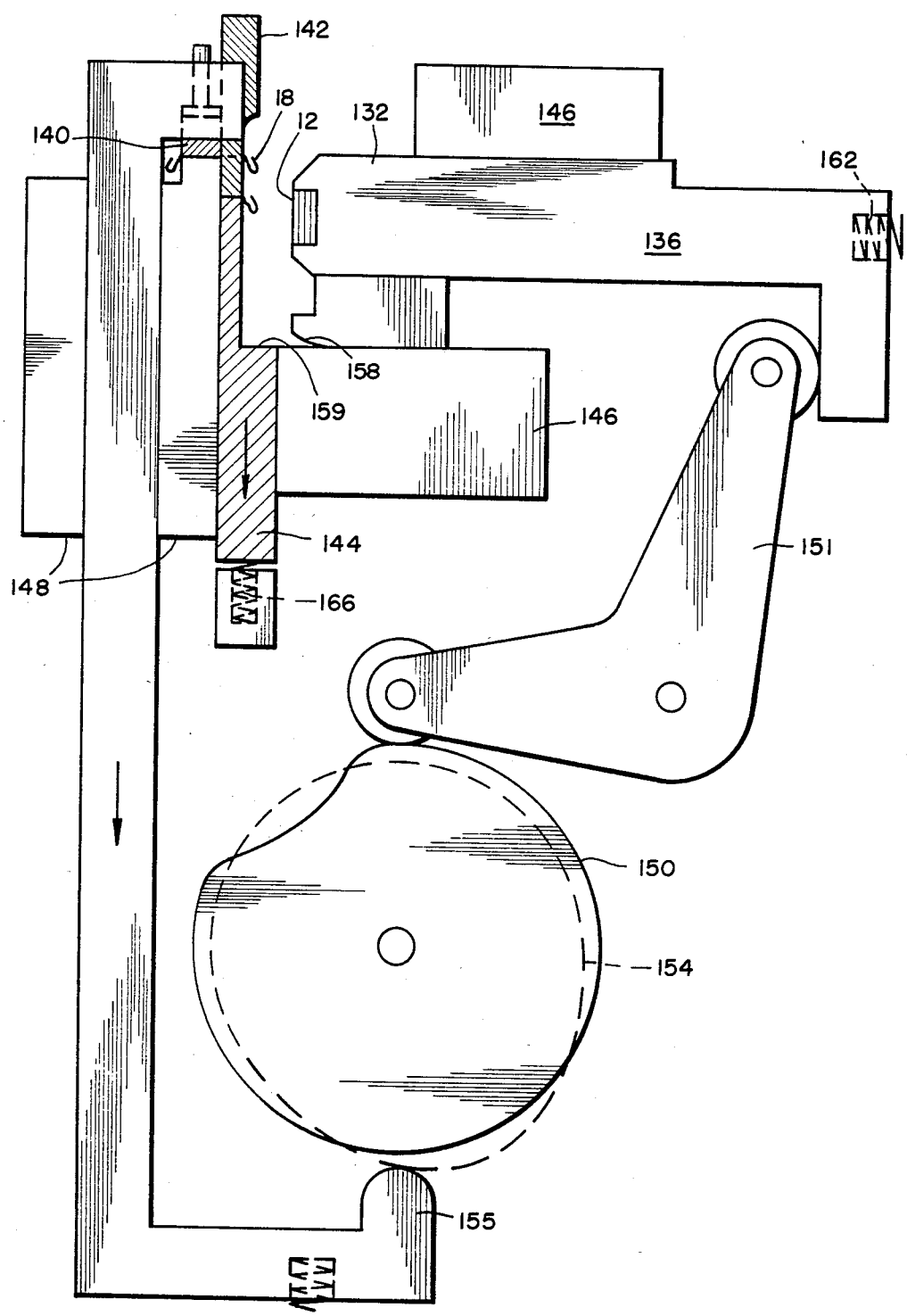

FIG. 11b shows the mechanism after the cutting punch 142 and pressure pad 144 have moved downwards under the action of cam 154 and broken off the contacts 18 to be inserted and brought them downward into full alignment with the openings 14 in the body 12. The cam 150 has maintained the carriage 136 in its right-hand position.

Figure 11C:
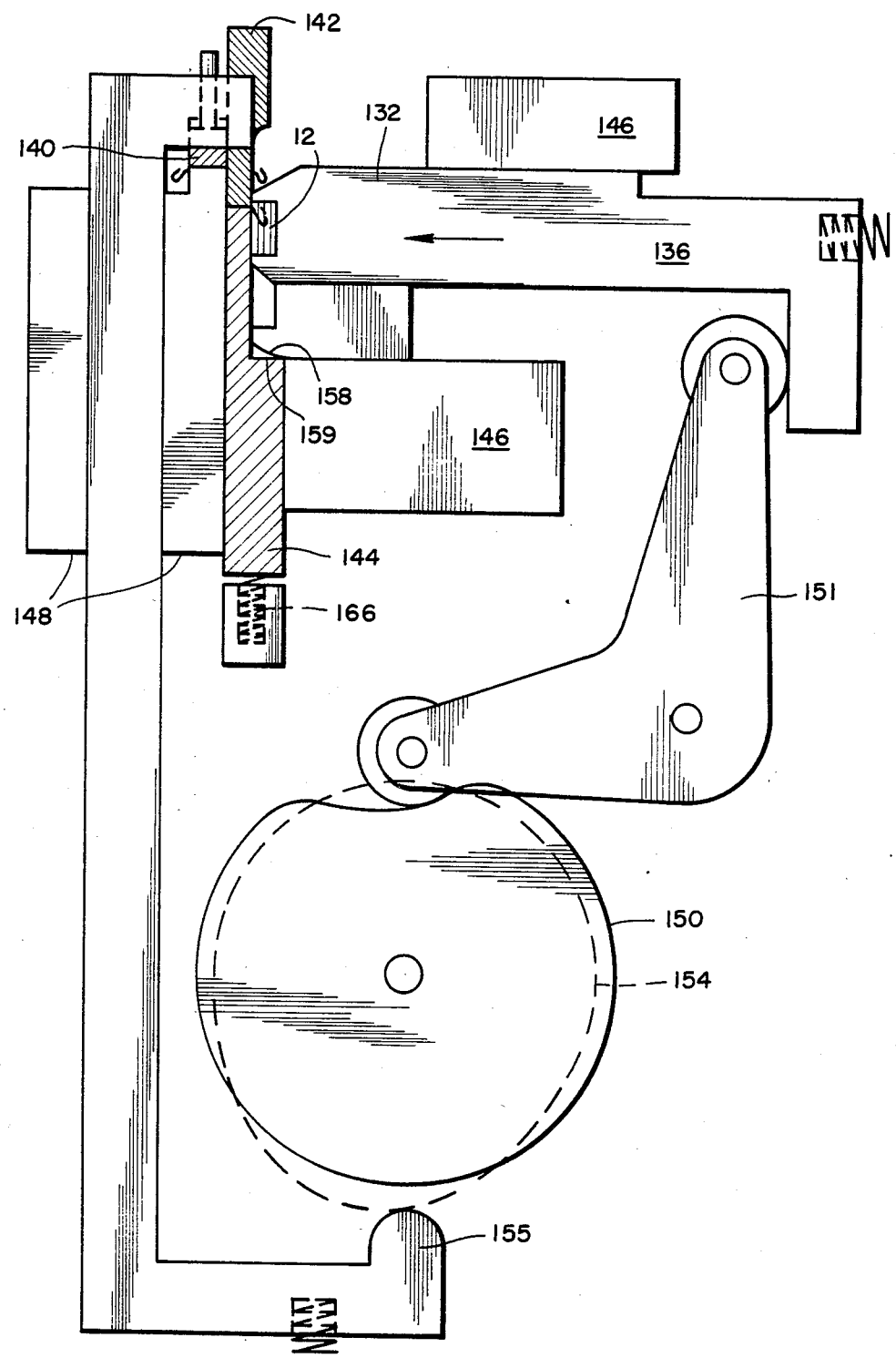

FIG. 11c shows the point in the cycle where cam follower 151 has entered a depression in the cam 150 allowing the carriage to move to the left and bring the body contained in the jaws 130 towards the separated and lowered contacts so that the body openings receive these contacts therein. At this point, the cutting punch 142 and pressure pad 144 are in their lower most positions still gripping the legs 28 of the contacts 18. Cam 158 has also engaged behind cam follower surface 159 on the pressure pad. The only movement that occurs between FIGS. 11b and 11c is the carriage 136 moving to the left to receive the contacts 18 in the body openings 14.

Figure 11D:
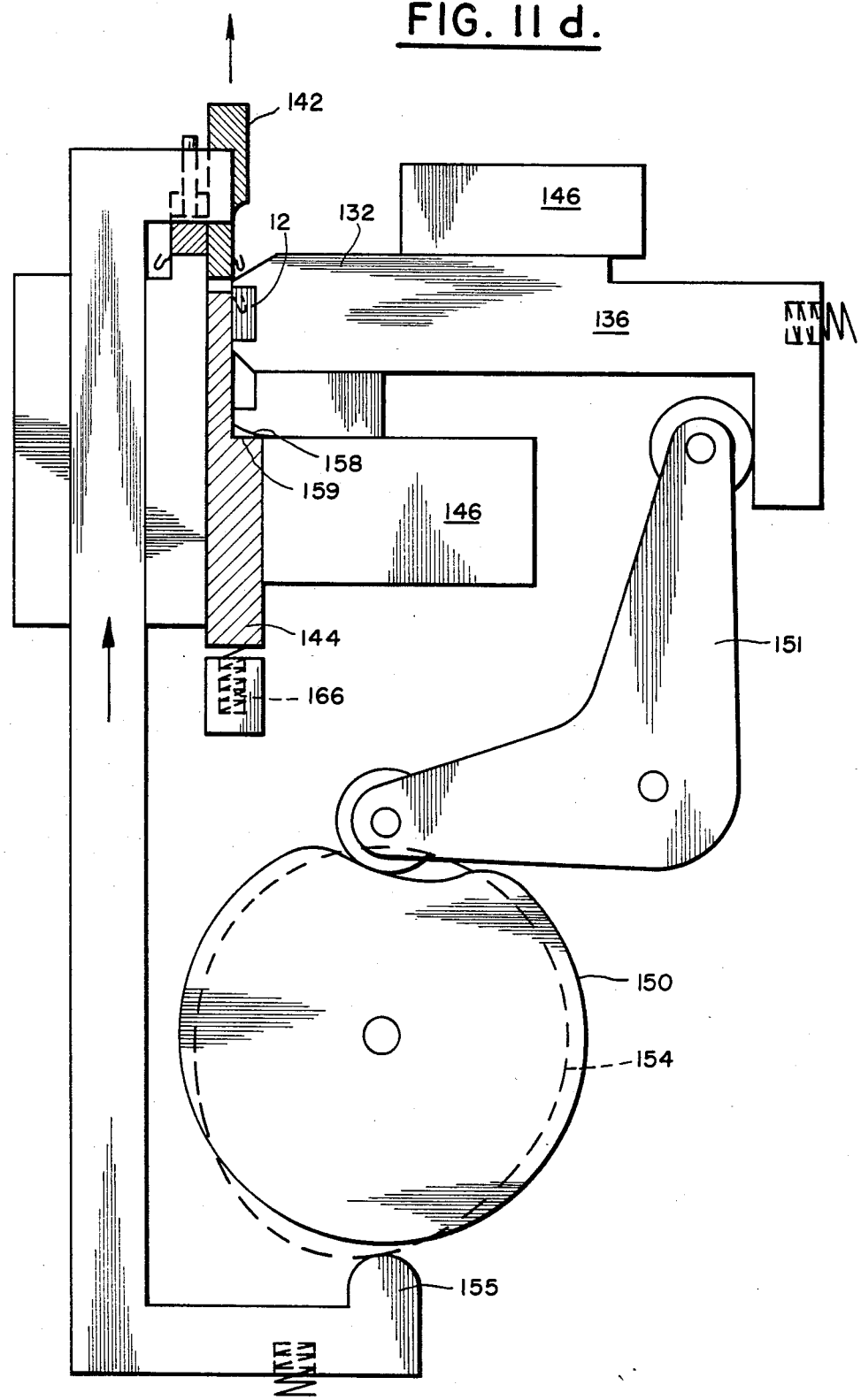

In FIG. 11d, cam follower 155 has been allowed to lift up under the action of spring 164 by virtue of the surface profile of cam 154. The cutting punch 142 is driven up off the contacts to its uppermost position. At this point, the pressure pad 144 is held down by cam 158 although its spring 166 tends to urge it to its uppermost position. Also, at this time, the carriage 136 is still in its left-hand position. Now, however, the contacts held by the body 12 in the holder 132 are no longer held between the pressure pads 144 and cutting punches 142 and are free to move with the holder when it moves to the right on carriage 136. Thus, the action occurring between FIGS. 11c and 11d is simply to allow the cutting punch to move to its uppermost position thereby freeing the contacts that have been broken off and inserted.

Figure 11E:
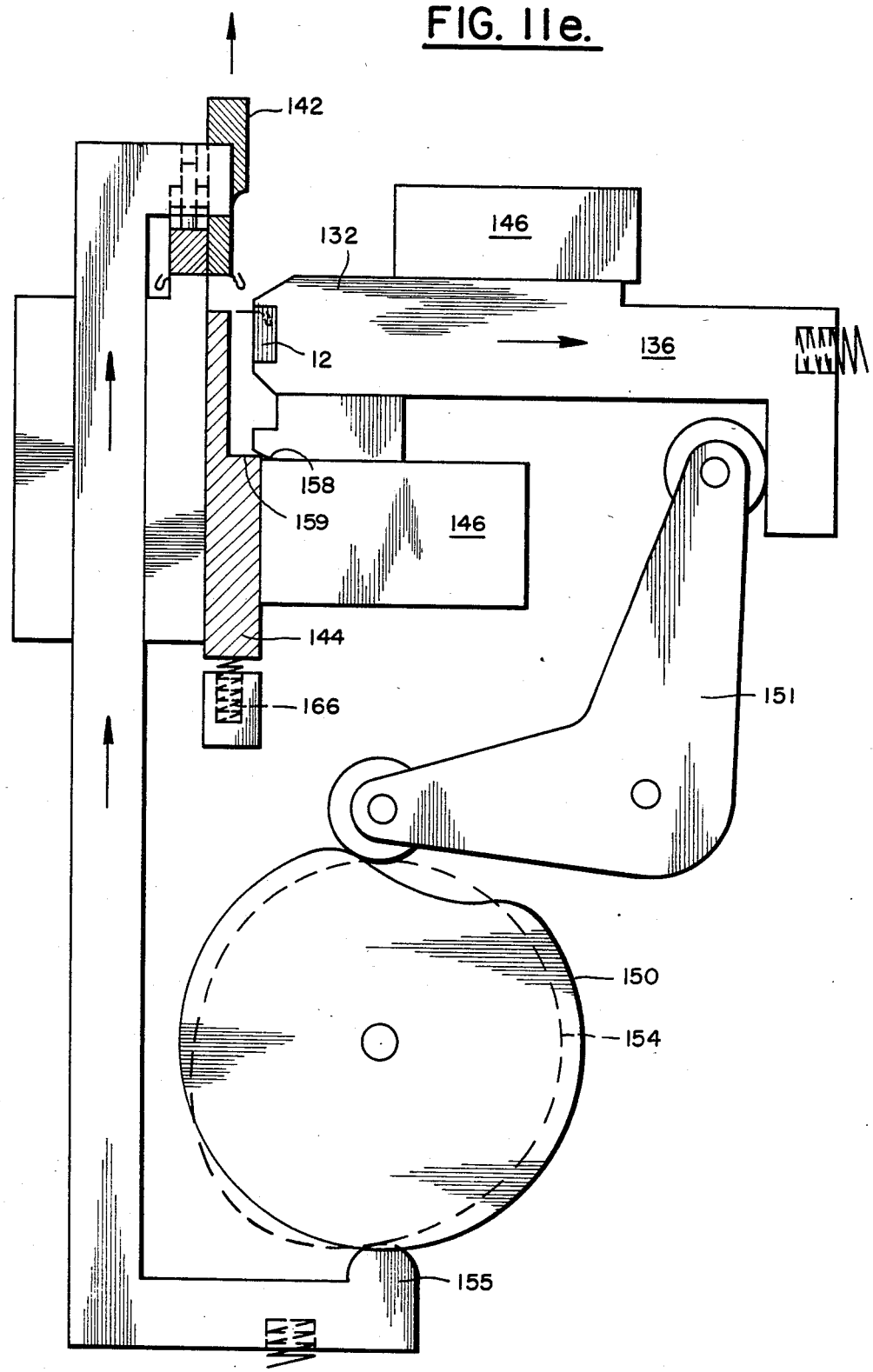

FIG. 11e shows the carriage 136 moving to the right thereby removing the assembled body 12 and contacts 18 out of the area of the contact strip. As the carriage moves to the right, the contact strip is indexed to place the next set of contacts to be inserted in their proper positions relative to the next body 12 to be placed in the jaws 130 of the holder 132. The pressure pad 144 is delayed from lifting to its uppermost position at this time by virtue of cam 158 acting on the pressure pad 144 through cam follower surface 159. This delay provides enough time to index the contact strip 60 before the next group of contacts 18 is grasped between the cutting punches 142 and the pressure pads 144.

Finally, once the carriage has moved all the way to its full, right-hand location, the elements are once again arranged as shown in FIG. 11a so that a new body can be fed into position and the process repeated.

After a body 12 has passed through the contact assembly area 102, it passes to the base assembly station 104 whereat the base member 22 is attached to it. As the body exits the second contact assembly station 112, it now has two rows of contacts 18 therein and has completed the contact insertion process. At the base assembly station 104, base members 22 are fed into a position whereat they can be assembled between the legs 28 of the contacts 18 onto the connector body.

Figure 12:
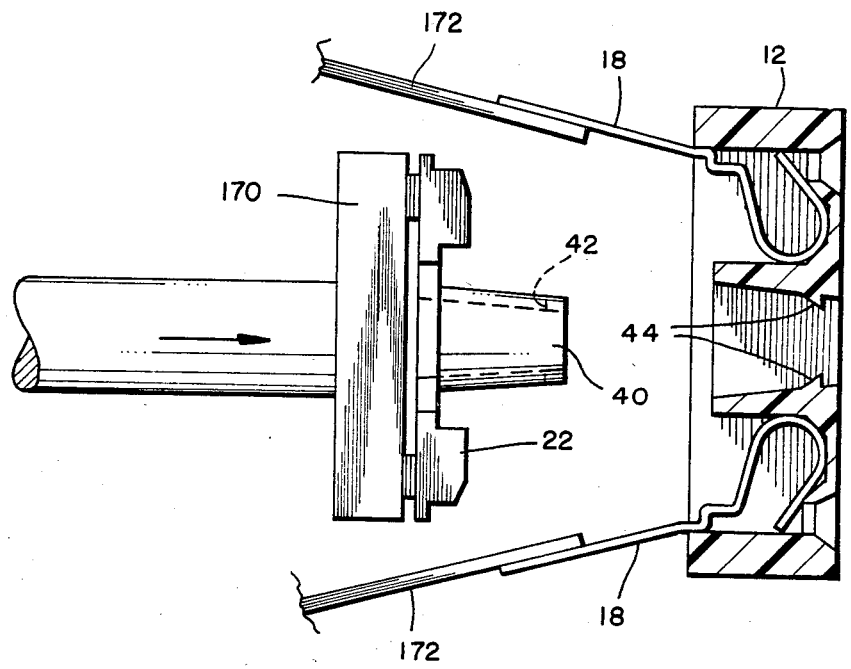
FIG. 12 shows the step of attaching a base member to a connector body to clamp the contacts in position in the openings.

Any suitable assembly process can be used. Thus, as schematically illustrated in FIG. 12, a ram 170 and assembly guide 172 arrangement is used to connect the base to the body. The assembly guide 172 comprises a pair of inwardly sloping elements which are placed against the legs of the contacts 18. As the legs are slightly spread apart by the elements, sufficient room is provided for the base to be brought therebetween and snapped into the body. The base member 22 is driven onto the body by the ram until the lips 42 on the tongues 40 of base 22 snap behind the barbs 44 on the body 12.

Referring again to FIGS. 6a-d, the connector inspection station permits a determination whether the connectors have been assembled properly. Any suitable device can be used for this purpose. For instance, a laser-type optical detector arrangement can be used to test a number of aspects of the final connection. Such a device could determine if contacts are missing, if the base is fully connected onto the housing, if the contact legs are bent too severely out of shape, etc. Any suitable selective removal means could be used on defective connectors to eliminate them from the assembly system.

Figure 13:
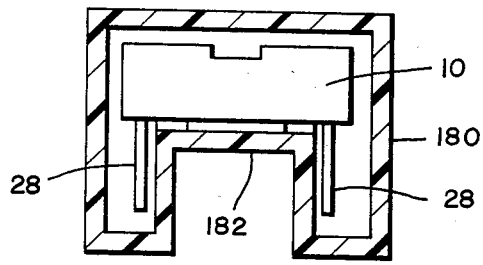
FIG. 13 is a cross-section through a packaging tube showing a connector positioned therein.

After assembly and inspection, the completed connectors 10 are placed into a packing tube 180 for shipping or otherwise deposited in a suitable collection means. The tube 180 is a long plastic extrusion which is shown in cross-section in FIG. 13. The completed connectors are inserted end-to-end so that a plurality of them are enclosed in the tube. As seen in FIG. 13, the shipping tube is shaped to accommodate the specific shape of the connector and the body of the connector is supported on portion 182 of the tube with the legs 28 of the contacts depending on each side of this portion.

The assembly line can be suitably microprocessor controlled as by a TI-510 or TI-5 microprocessor made by Texas Instruments, Dallas, Tex. The microprocessor can be connected to a number of optical and electrical sensors which are able to detect fault conditions within the machine. The faults can occur in the machine sequencing or in the actual operation of the hardware. It can also be used extensively in the inspection station to determine the rejection of specific connectors. Since the machine is a high speed one, any jam-up or other problem occurring in the production line requires that the machine be shut down immediately to avoid undue damage. The microprocessor is used for this purpose.

Although specific embodiments of the invention have been described above, it will be realized that various modifications and changes may be made without departing from the spirit and scope of the invention.

For example, although in the embodiment illustrated two rows of openings are supplied with contacts fron a double strip of contacts, it will be understood that separate contact strips may be provided for each row of openings in which case both rows could be loaded with contacts simultaneously. It will also be realized that a double strip of contacts may be used to load contacts into two different bodies at the same assembly location.

While the invention has been specifically described above in relation to connectors having two rows of openings in a two-part body, it will be understood that the methods and apparatus of this invention are generally applicable to the assembly of connectors having an insulating body with openings or sockets into which conductive contacts are inserted. Thus, such a connector may have one or several rows and may have a one-part body onto which the contacts are a press-fit, for example.

While in the embodiments described herein the contact strip is out of tracking alignment with the bodies and the contacts are displaced downwardly below the strip after separation to allow the bodies to be traversed inwardly beneath any intermediate contacts remaining on the strip, it will be appreciated that in an alternative embodiment the contact strip may be fully aligned with the body openings and the contacts separated and moved sideways in the plane of the strip into the body openings. By moving the separated contacts towards the body, the interference problem can thus be eliminated.

Although it is preferred that the contact strip be advanced relative to a fixed body location, the strip could be advanced in large steps A only with the smaller steps B effected by adjustment of the body position.

Another embodiment of contact strip advancing mechanism comprises a pawl and ratchet arrangement with the pawl member working on the central holes 70 in the contact strip. The pawl is driven by a settable ratchet; that is, a ratchet that can be programmed to make the pawl travel the two different distances A and B in alternating fashion. The end of the pawl is shaped so that it slips into a hole 70 in the contact strip and moves to the right through a distance A or B. Upon reaching its fully advanced position, the pawl then returns until it slips into the next selected hole in the strip so that it can advance the strip again.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a method of assembling electrical connectors of the kind having a body defining a plurality of openings and a conductive contact mounted in each said opening, the method comprising the steps of:
   (a) serially feeding connector bodies to a mounting location,
   (b) advancing a strip of contacts stepwise to said mounting location, said strip of contacts having groups of contacts each corresponding in number and pitch to the openings in a said body, to register respective groups of contacts with respect to the openings in the respective connector bodies, (c) separating each registered group of contacts from the strip, and (d) inserting the separated contacts in the respective openings in a connector body, the improvement that the pitch of the contacts on the strip is less than the pitch of the openings in the connector bodies whereby the contacts of each group are interspersed with the contacts of at least one other group.

2. A method of assembling electrical connectors of the kind having an insulating body defining a plurality of openings and a conductive contact mounted in each opening with one end thereof in the opening and the other end projecting out of the body, including the steps of:

(a) serially feeding connector bodies to a mounting location, (b) advancing a strip of contacts stepwise to said mounting location, said strip of contacts having groups of contacts which correspond in number and pitch to the openings in the connector bodies, to register successive said bodies with respect to successive groups of contacts, said contacts on the strip having a pitch which is a whole number submultiple of the pitch of the openings in the bodies whereby the contacts of each group are interspersed with the contacts of at least one other group, (c) separating from said strip the contacts in a said group registered with respect to a said connector body at the mounting location, and (d) inserting separated contacts into respective openings in said connector body at the mounting location, said stepwise advancing of the strip being varied in dependence upon the position on the strip of the next group of contacts to be registered in relation to the position on the strip of the last preceding group of contacts to be registered, separated and inserted.

3. A method of assembling electrical connectors according to claim 1 or 2, wherein the pitch of said contacts is half the pitch of the openings in said connector bodies.

4. A method of assembling electrical connectors according to claim 2 for assembling electrical connectors having two rows of said openings in said connector bodies, wherein the contacts of a first group of said contacts are aligned with and inserted into the openings of one of said rows of openings and the contacts of a second group of said contacts are aligned with and inserted into the openings of the other of said rows of openings.

5. A method of assembling electrical connectors according to claim 4 wherein said strip has a first series of contacts projecting in one direction and a second series of contacts projecting in the opposite direction, and each said connector body is first registered with respect to a group of contacts of said first series to receive those contacts in the openings of said one row at a first said mounting location, and said strip is then inverted and said connector body is registered with respect to a group of contacts of said second series to receive those contacts in the openings of said other row at a second said mounting location.

6. A method of assembling electrical connectors according to claim 4, wherein said strip has a first series of contacts projecting in one direction and a second series of contacts projecting in the opposite direction, and each said connector body is first registered with respect to a group of contacts of said first series to receive those contacts in the openings of said one row at a first said mounting location, and is then inverted and registered with respect to a group of contacts of said second series to receive those contacts in the openings of said other row at a second said mounting location.

7. A method of assembling electrical connectors according to claim 2, wherein said groups of contacts are initially registered with respect to said connector bodies with said contacts aligned longitudinally and misaligned transversely with the body openings, and are moved into full alignment with the body openings following separations of the contacts in the strip.

8. A method of assembling electrical connectors according to claims 1, 2, 4, 6, or 5 wherein the connector bodies are fed to a said mounting location in batches and a number of groups of contacts equal to the number of connector bodies in a said batch is registered with respect thereto, said separating and inserting steps including simultaneously separating the contacts of said registered groups and simultaneously inserting the separated contacts in the respective openings of the connector bodies in the batch.

9. A method of assembling electrical connectors according to claim 2 further including the step of assembling a base member to each said connector body to clamp said contacts in said openings with the other ends of the contacts extending out of the body through the base.

10. Apparatus for assembling electrical connectors of the kind having a connector body defining a plurality of openings and a conductive contact mounted in each opening, said apparatus comprising:

(a) a mounting station operative to receive a plurality of connector bodies and contacts from a feeding means, (b) means for feeding connector bodies and a strip of contacts to said mounting station to register successive connector bodies with respect to successive groups of contacts on said strip, the contacts in each group corresponding in number and pitch to the openings in the connector bodies and the contacts on the strip having a pitch which is less than the pitch of said openings in the bodies whereby the contacts of each group are interspersed with the contacts of at least one other group, (c) means operatively associated with said strip feeding means for separating from said strip the contacts while the contacts are in said group registered with respect to said connector body by said feeding means at the mounting station whereby the contacts are adapted to be inserted in said openings located in said bodies, and (d) means operatively associated with said separating means for inserting said contacts into respective openings in the same connector body at the mounting station after said contacts have been separated from said strip by said separating means, said strip feeding means being adapted to effect different relative feed movements of said strip and said connector bodies depending whether the next group of contacts to be registered with respect to the next connector body was interspersed with the group of contacts inserted in the immediately preceding connector body.

11. Apparatus for assembling electrical connectors of the kind having an insulating body defining a plurality of openings and a conductive contact mounted in each opening with one end thereof in the opening and the other end projecting out of the body, said apparatus comprising:
(a) a mounting station operative to receive a plurality of connector bodies from a feeding means and a strip of contacts from an advancing means,
(b) means for serially feeding connector bodies to said mounting station,
(c) means for advancing a strip of contacts stepwise to said mounting station, said advancing means operative to position the contacts for insertion within the connector bodies, said strip of contacts forming groups which correspond in number and pitch to the openings in the connector bodies, to register successive said groups of contacts with respect to successive said connector bodies, said contacts on the strip having a pitch which is a whole number sub-multiple of the pitch of the openings in the connector bodies whereby the contacts of each group are interspersed with the contacts of at least one other group,
(d) means operatively associated with said strip advancing means for separating from said strip the contacts while the contacts are in said group registered with respect to a said connector body by said advancing means at the mounting station whereby the contacts are adapted to be inserted in said openings located in said bodies, and
(e) means operatively associated with said separating means for inserting the one ends of said separated contacts into respective openings in the said connector body at the mounting station after said contacts have been separated from said strip by said separating means, said strip advancing means being adapted to advance the strip for registering the next group of contacts with the next connector body by a first amount where the next group of contacts to be registered was interspersed with the group of contacts last registered with interspersed with the group of contacts last registered and separated and by a second amount larger than the first amount where the next group of contacts to be registered was alongside the group of contacts last registered and separated.

12. Apparatus according to claim 11 for assembling electrical connectors having two rows of said openings, in which said contact strip has a first series of contacts projecting in one direction and a second series of contacts projecting in the opposite direction, said apparatus including:
a first said mounting station operative to receive a plurality of connector bodies and first contacts from said feeding means including first said separating means for separating the first contacts from said strip whereby these contacts are adapted to be inserted into certain of said openings and first said inserting means for inserting the first contacts in certain of said openings after they have been separated from said strip by said first separating means, a second said mounting station spaced from said first mounting station and operative to receive a plurality of connector bodies and second contacts from said feeding means and including second said separating means for separating the second contacts from said strip whereby these contacts are adapted to be inserted into certain of said openings and second said inserting means for inserting the second contacts in certain of said openings after they have been separated from said strip by said second separating means, said body feed means being adapted to feed said connector bodies to said first and second mounting stations in turn, and said strip advancing means being adapted to advance said strip to said first mounting station to register successive groups of contacts in said first series with the first rows of openings of successive said connector bodies at said first mounting station and further to advance said strip to said second mounting station to register at said second mounting station successive groups of contacts in said second series with the second rows of openings of successive said connector bodies which have previously received contacts in their first rows of openings at said first mounting station, said advancing means operative to position the contacts for insertion within the connector bodies.

13. Apparatus for assembling electrical connectors according to claim 12, wherein said body feed means includes means for inverting said connector bodies as said bodies are moved between said first and second mounting stations, said inverting means adapted to position said first and second series of contacts for insertion within said connectors bodies.

14. Apparatus for assembling electrical connectors according to claim 12, wherein said strip advancing means includes means for inverting said strip between said first and second mounting stations, said strip inverting means adapted to position said first and second series of contacts for insertion within said connector bodies.

15. Apparatus for assembling electrical connectors according to claim 10, 11, 12, 13 or 14 wherein the pitch of said contacts on the strip is half the pitch of said openings in the connector bodies.

16. Apparatus for assembling electrical connectors according to claim 11, 12, 13 or 14 wherein said body feed means is adapted to feed said bodies to a said mounting station in batches and said strip advancing means is adapted to register with respect thereto a number of said groups of contacts equal to the number of connector bodies in the batch, said separating means and inserting means being adapted to separate the contacts of all said groups simultaneously and to insert them in respective connector bodies simultaneously.

17. Apparatus for assembling electrical connectors according to claim 11, 12 13 or 14 wherein said body feed means positions the connector bodies at a said mounting station out of tracking alignment with said strip of contacts, said separating means separates and displaces the contacts in a said group to line them up with the openings in the respective connector body of the mounting station, and said inserting means displaces the connector body towards said contacts so that the contacts are received in respective openings in the connector body.

18. Apparatus for assembling electrical connectors according to claim 10 or 11, further including means located at a second station for attaching a base member to each said connector body to clamp the contacts in the body openings, said attaching means operating after said contacts are inserted within said connector bodies by said inserting means.

19. Apparatus for assembling electrical connectors according to claims 12, 13 or 14 wherein said strip advancing means further includes a drive member operative to engage and advance said contact strip by engaging regularly spaced holes located along a central ribbon of said contact strip, the ribbon having said first and second series of contacts attached along opposite sides respectively thereof.

* * * * *